Apr. 24, 1923.

H. J. ROUND

WIRELESS TRANSMITTING STATION

Filed Dec. 13, 1921

1,452,849

Inventor
HENRY J. ROUND
By his Attorney Ira J. Adams

Patented Apr. 24, 1923.

1,452,849

UNITED STATES PATENT OFFICE.

HENRY JOSEPH ROUND, OF LONDON, ENGLAND, ASSIGNOR TO RADIO CORPORATION OF AMERICA, A CORPORATION OF DELAWARE.

WIRELESS TRANSMITTING STATION.

Application filed December 13, 1921. Serial No. 522,122.

*To all whom it may concern:*

Be it known that I, HENRY JOSEPH ROUND, a British subject, and a resident of 9 Woodberry Crescent, Muswell Hill, London N., England, have invented certain new and useful Improvements in Wireless Transmitting Stations, of which the following is a specification accompanied by drawings.

This invention relates to wireless transmitting stations in which an aerial is situated at a distance from the generator. This may occur, for instance, in the case of a multiple transmitting station comprising more than one aerial, say, for the purpose of sending simultaneously on different wave lengths.

According to this invention I replace the aerial tuning inductance by a trunk cable extending from the foot of the aerial to the generator or power house, and I shield this cable from the earth by a system of wires which may be laid underneath the cable but are preferably arranged so as completely to surround the cable in a kind of cage.

Figure 1:
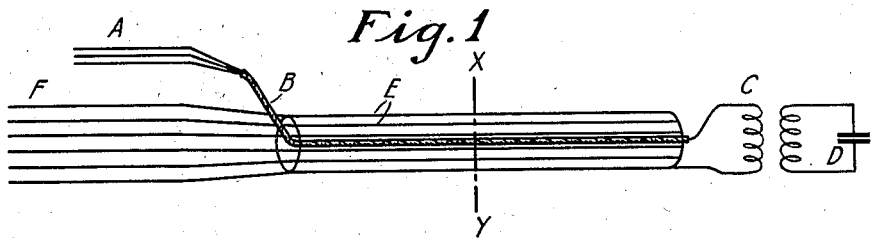
Figure 2:
Figure 3:
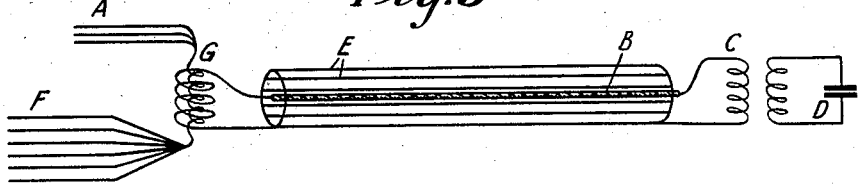
Figure 4:
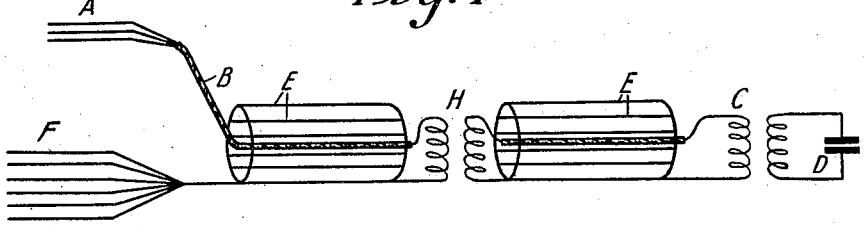
Figure 5:
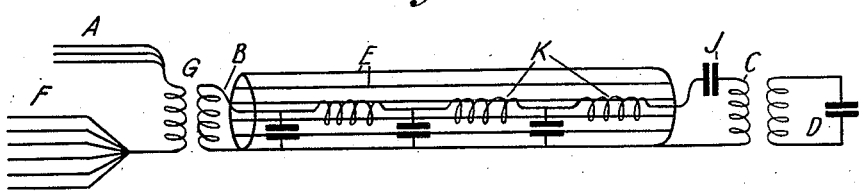

My invention is illustrated by the accompanying drawing in which Fig. 1 is a diagrammatic representation of an aerial system embodying the invention. Fig. 2 is a cross section of the cable and shield. Figs. 3 to 5 are modifications.

In Figure 1, A is the aerial which is connected by a cable B to the secondary of a transformer C, the primary of which forms part of the main oscillatory circuit D in a power house. The cable is surrounded by a number of wires E forming a kind of cage as shown in Figure 2 which is a section on the line XY of Figure 1. The wires E are connected to an earth screen F composed of a number of wires arranged between the earth and the aerial and extending in the case of a T, L or fan shaped aerial well beyond the free or unearthed end or ends of the aerial and also laterally beyond the aerial. Generally the larger the diameter of the cage, the better, the cable of course passing along its axis.

If it is found necessary to carry the power over greater distances than the allowable inductance of such a system will permit, the cage and cable may be divided into lengths which are inductively coupled together for example by means of the coupling coils H, H as indicated in Fig. 4.

Figure 3 shows a modification in which the wires E are connected at one end to the secondary of the transformer C and at the other end to the primary of a transformer G so as to form with the cable an untuned intermediate circuit, the secondary of G being connected to the aerial and to the earth screen.

If desired the intermediate circuit BE may be tuned by a parallel or series condenser J. If desired also the central core of the cable may have inductances K spaced along its length, or the inductances may be continuously distributed along the cable. These features although illustrated in Fig. 5 may be equally well applied to the modification of Fig. 1.

When the power is supplied by a valve oscillator such a shielded or caged cable may be used with advantage in the primary circuit of the valve.

It will be recognized that such arrangements will tend owing to the capacity of the cable to reduce the effective height of the aerial, but the extra convenience of the arrangements will more than counterbalance this.

Having described my invention, what I claim is:

1. In a wireless transmitting station the combination of an aerial, a distant generator, a cable between the aerial and the generator and a system of wires shielding the cable from the earth.

2. In a wireless transmitting station, the combination of an aerial, a distant generator, a cable between the aerial and the generator and a system of conductors surrounding the cable.

3. In a wireless transmitting station, the combination of an aerial, a counterpoise, a distant generator, a cable between the aerial and the generator, and a system of wires shielding the cable from the earth connected to the counterpoise.

4. In a wireless transmitting station the combination of an aerial, a distant generator, a cable between the aerial and the generator, a system of wires shielding the cable from the earth, and intermediate transformers for the purpose of allowing the cable to be greatly lengthened.

5. In a wireless transmitting station, the combination of an aerial, a distant generator, a cable between the aerial and the generator, inductance distributed in said cable and a system of conductors shielding the cable from the earth.

6. In a wireless transmitting station, the combination of an aerial, a distant generator, a cable between the aerial and the generator, a tuning condenser in said cable and a system of conductors shielding the cable from the earth.

7. In a wireless transmitting station, the combination of an aerial, a distant generator, a cable between the generator and aerial, and a counterpoise under said aerial having conductors extending between the cable and the earth.

8. In a wireless transmitting station, the combination of an aerial, a distant generator, a cable between the aerial and the generator, a system of conductors shielding the cable from the earth, a counterpoise and a transformer having its primary connected between the aerial and counterpose and its secondary connected to the cable and the shielding system.

9. In a wireless transmitting station, the combination of an aerial, a distant generator, a cable between the aerial and the generator, a system of conductors shielding the cable from the earth, a counterpoise, a transformer having its primary connected between the aerial and counterpoise and its secondary connected to the cable and the shielding system and tuning means connected in the circuit comprising said shielding system and cable.

10. In a wireless transmitting station, the combination of an aerial, a distant generator, a cable between the aerial and the generator, a system of conductors shielding the cable from the earth, a counterpoise electrically connected to the shielding system, a transformer having its primary connected between the aerial and counterpoise and its secondary connected to the cable and the shielding system.

11. In a wireless transmitting station, the combination of an aerial, a generator, a cable between the aerial and the generator, and a system of wires shielding the cable from the earth and electrically connected with each other and with the cable.

12. In a wireless transmitting station, the combination of an aerial, a generator, a cable between the aerial and the generator, a system of wires shielding the cable from the earth, an electrical connection between the wires and the cable, an inductance coil in said connection and means for coupling the generator with the inductance coil.

13. In a wireless transmitting station, the combination of an aerial, a counter-poise, a generator, a cable between the aerial and the generator and a system of wires shielding the cable from the earth and connected at one end to the counter-poise and at the other end to the cable.

14. In a wireless transmitting station, the combination of an aerial, a generator, a cable between the aerial and the generator, intermediate transformers in the cable for dividing it into a plurality of sections and allowing it to be greatly lengthened, and a system of wire shielding one of the sections of the cable from the earth and connected with the transformer coils at the opposite ends of the section.

15. In a wireless transmitting station, the combination of a device for utilizing electrical energy, and means for transmitting energy to the device comprising a cable, intermediate transformers in the cable for dividing it into a plurality of sections, a system of wires shielding one of the sections of the cable from the earth and connected with the transformer coil at the opposite ends of the section, and means coupled with one of the transformer coils for supplying energy to the cable.

16. In a wireless transmitting station, the combination of a device for utilizing electrical energy and means for supplying energy to the device comprising a cable including a plurality of sections, transformer coils at the ends of one of the sections of the cable and a system of wires shielding the section of the cable from the earth and connected with the transformer coils so as to provide a closed circuit with the section of the cable.

17. In a wireless transmitting station, the combination of an aerial, a generator, a cable between the aerial and the generator comprising a plurality of sections, transformers for connecting the sections together, each of the sections being connected at its ends to coils of the transformers, and a system of wires shielding the cable from the earth intermediate between each of the transformers and connected to the other ends of the transformer coils so as to comprise a closed circuit with the section of the cable.

HENRY JOSEPH ROUND.